J. R. MORRIS.
Journal-Boxes.

No. 138,916.

Patented May 13, 1873.

Witnesses:
G. Martins
Solon C. Kenon

Inventor:
Joseph R. Morris
per ———
Attorneys.

UNITED STATES PATENT OFFICE.

JOSEPH R. MORRIS, OF HOUSTON, TEXAS.

IMPROVEMENT IN JOURNAL-BOXES.

Specification forming part of Letters Patent No. 138,916, dated May 13, 1873; application filed April 3, 1873.

*To all whom it may concern:*

Be it known that I, JOSEPH R. MORRIS, of Houston, in the county of Harris and State of Texas, have invented a new and Improved Combined Journal-Box and Lubricator for Shafting, Axles, &c.; and I do hereby declare the following to be a full, clear, and exact description of the same, reference being had to the accompanying drawing forming part of this specification, in which—

Figure 1:
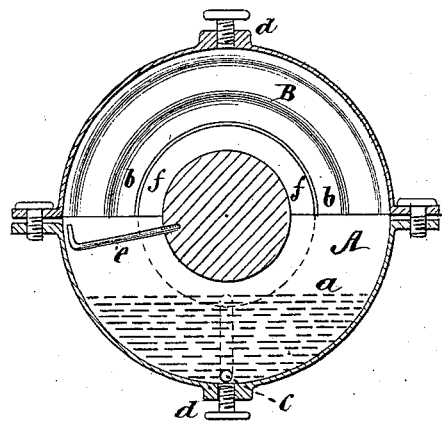
Figure 2:
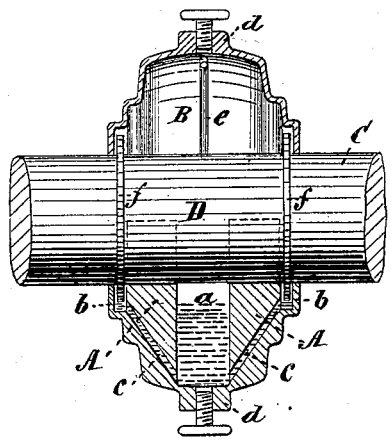

Figure 1 is a transverse sectional elevation of a journal-box embodying my invention, and Fig. 2 is a side sectional elevation of the same.

This invention consists in combining with a journal-box of peculiar construction an oil-elevator and a device for saving, to be used over and over again, oil which would otherwise escape and be wasted.

In the drawing, A A represent the bearings of a journal-box, with an intermediate oil-reservoir, $a$, and outside recesses $b\ b$, which communicate with the oil-reservoir at the bottom through channels or holes $c\ c$, the whole being cast in one piece, and forming the lower half of the box. B is the upper half of the box, of the same external form as the lower half, but without the internal bearings and recesses with which the under half is provided. At the center of the upper half or cap B of the box is a hole, $d$, through which the oil-reservoir is supplied with oil, and the lower half of the box is provided with a similar hole, which is located at the bottom and center of the oil-reservoir, and provided with a screw-threaded stopper. This latter hole is to allow of the removal of the contents of the oil-reservoir when it is desired to clean the same. C is a shaft, and D a journal thereof, to which is secured an arm, $e$, and two annular disks, $f\ f$, which rotate in the oil-reservoir $a$ and recesses $b\ b$, respectively. The two parts of the box are provided with ears and fitted and secured together with bolts or screws in the usual manner.

The operation is as follows: The oil-reservoir being partly filled with the lubricating material and the shaft put in motion, at each revolution thereof the arm rises and casts a small quantity of the lubricant upon the journal, which carries it to the bearings, but it is prevented from going outside of the box, and being thereby wasted, by the annular disks, which turn it into the recesses, whence it runs back into the reservoir through the channels leading thereto from the recesses, and can thus be used again.

Having thus described my invention, what I claim as new, and desire to secure by Letters Patent, is—

The combination of the journal-arm $e$ and annular disks $f\ f$, in combination with the bearings A A, intermediate oil-reservoir, outside recesses, and inclined channels, all as and for the purpose specified.

JOSEPH R. MORRIS.

Witnesses:
CLARENCE W. HARPER,
L. T. NOYES.